US005636708A

United States Patent [19]
Wedeven et al.

[11] Patent Number: 5,636,708
[45] Date of Patent: Jun. 10, 1997

[54] METHOD AND DEVICE FOR BROAD TEMPERATURE RANGE VAPOR LUBRICATION

[76] Inventors: Lavern D. Wedeven, #1 Old Covered Bridge Rd., Newtown Square, Pa. 19073; Aaron J. Goodell, 272 Canterbury Dr., West Chester, Pa. 19380; Mark J. Stimler, 121 E. Market St.; William F. Black, 301 S. Church St., both of West Chester, Pa. 19382; Oyelayo O. Ajayi, 702 Charleston Greene, Malvern, Pa. 19355

[21] Appl. No.: 243,113

[22] Filed: May 16, 1994

[51] Int. Cl.$^6$ ............................................. F01M 5/00
[52] U.S. Cl. ..................... 184/6.22; 184/6.11; 184/6.26; 184/104.1
[58] Field of Search ................ 184/6.22, 6.26, 184/6.11, 6.12, 104.1, 109, 55.1, 57, 6.16, 7.4; 384/468, 473, 492, 527, 912; 92/154; 60/39.08; 415/110–112, 175, 176; 74/467, 468; 475/159, 160

[56] References Cited

U.S. PATENT DOCUMENTS

| | | | |
|---|---|---|---|
| 3,645,319 | 2/1972 | Pondelicek et al. | |
| 3,843,962 | 10/1974 | Bogue | 308/187 |
| 3,978,908 | 9/1976 | Klaus et al. | |
| 4,192,560 | 3/1980 | Hartnett | 308/187 |
| 4,363,216 | 12/1982 | Bronicki | 184/6.22 |
| 4,592,930 | 6/1986 | Schmidt et al. | |
| 4,738,336 | 4/1988 | Smith et al. | 184/7.4 |
| 4,770,549 | 9/1988 | Rokkaku et al. | 384/492 |
| 4,802,332 | 2/1989 | Beale | |
| 4,870,213 | 9/1989 | Inbasekaran et al. | |
| 4,955,424 | 9/1990 | Takahisa et al. | |
| 4,990,283 | 2/1991 | Visca et al. | 252/309 |
| 5,015,405 | 5/1991 | Kar et al. | |
| 5,017,022 | 5/1991 | Ruggles et al. | |
| 5,032,301 | 7/1991 | Pawloski et al. | |
| 5,055,009 | 10/1991 | Gutknecht | 384/476 |
| 5,137,422 | 8/1992 | Price et al. | 415/200 |
| 5,139,876 | 8/1992 | Graham et al. | 428/411.1 |
| 5,163,757 | 11/1992 | Graham | 184/104.1 |
| 5,310,263 | 5/1994 | Lee et al. | 384/100 |
| 5,327,998 | 7/1994 | Rosado et al. | 184/6.22 |
| 5,351,786 | 10/1994 | Graham et al. | 184/6.26 |

*Primary Examiner*—F. Daniel Lopez
*Assistant Examiner*—Christopher Verdier
*Attorney, Agent, or Firm*—Robert Charles Beam, Esq.

[57] ABSTRACT

Conventional liquid lubrication requires a compromise between high temperature properties for good lubrication and low temperature properties for pumpability. The major thrust of this invention is the preservation of the long life and reliable mechanism of elastohydrodynamic lubrication in the pursuit of elevated temperature lubrication. The mechanism of EHD lubrication is the primary source of lubrication for rolling element bearings, gears and other nonconforming contacting surfaces which must carry high loads over small areas of contact. The invention supplies the lubricant as a vapor which upon condensation provides an efficient replenishment of the inlet region to the elastohydrodynamic contact. The surfaces are encouraged to operate at elevated temperatures without cooling for reasons of efficiency. Broad temperature range EHD lubrication with perfluoroalkylpolyether fluids provide full EHD lubrication up to 500° C. The enhanced temperature range, small fluid quantity and the supply of lubricant in a vapor environment eliminates the need for complex lubrication and cooling hardware. The vapor lubrication scheme when applied to a rolling element bearing provides lubrication to 500° C. The invention provides high speed operation to 0.9 MDn (30,000 rpm with a 30 mm bore bearing) with the use of a driving air to overcome the internal windage generated by the high speed components.

28 Claims, 15 Drawing Sheets

METHOD AND DEVICE FOR BROAD TEMPERATURE RANGE VAPOR LUBRICATION

BACKGROUND OF THE INVENTION

1. Field of the Invention

The present invention is in the area of lubrication of rolling/sliding surfaces that may be required to operate over a large range of kinematic, stress and environmental conditions. Lubrication is conventionally supplied by liquid, solid, and sometimes gaseous materials which provide some kind of low shear strength film between the moving surfaces. The most reliable lubricating films are those generated by hydrodynamic (HD) or elastohydrodynamic (EHD) mechanisms which separate the surfaces by a pumping action due to the convergent nature of contact geometries in motion which generates sufficient pressure to cause a separation of the surfaces. This is done by fluids or lubricants having certain viscous properties. The oils are supplied to the contacting surfaces as a liquid in quantities generally sufficient for lubrication and cooling. Cooling is necessary because of temperature limitations which are almost always related to the oil's viscosity for lubrication or the thermal breakdown of the oil itself. To maintain proper cooling along with lubrication, oils are usually recirculated through a lubrication system with pumps, coolers, sumps, delivery lines and filters. One oil is used with selected viscous properties to cover a specific, but limited, range of temperatures.

This invention provides the processes and devices to lubricate surfaces over a broad temperature range with a small quantity of fluid that can be supplied with a simple system. The invention consists of the lubrication of surfaces with condensed vapors (vapor/condensation, or V/C lubrication) or with vapors that react with the surfaces (vapor/deposition, or V/D lubrication). The condensed vapors are sufficient in thickness to allow EHD film generation and even HD film generation. The amount of lubricant necessary to generate EHD lubricant films is very small, being only a "whisper" of condensate. A companion patent application Ser. No. 08/243,112, filed May 16, 1994, discloses the method for broad temperature range vapor lubrication. Vapors that react with the surfaces (see U.S. Pat. No. 3,978,908 September 1976 E. E. Klaus et al.) are used here as boundary films to supplement V/C lubrication. The preferred mechanism of lubrication is EHD where the surfaces are completely separated with an oil film so that the longest possible life of the surface can be achieved. The boundary film mechanism is called upon when the EHD mechanisms can no longer be maintained.

The invention is most practical with fluids that can be vaporized without leaving breakdown deposits or having the potential for fire. Presently, the most useful fluids are the perfluoropolyalkyethers (PFPE) which do not have a flash or fire point and can be vaporized and condensed without solid breakdown products. Another advantage of PFPE's is their availability over a large range of molecular weights or viscosities. This allows a new form of lubrication which is called variable property (VP) lubrication (see companion patent application Ser. No. 08/243,112). VP lubrication provides a condensate film on the surfaces which increases in molecular weight, or viscosity, with temperature so that HD or EHD lubrication is sustained to an extended temperature level. Chemical additives which are normally insoluble in PFPE's can be supplied as vapors to provide boundary lubrication. The introduction of the additive as a vapor circumvents the solubility limit problem with PFPE's.

2. Description of Prior Art

Most mechanical components are lubricated with systems which:

provide pressurized jets of oil;

drip feed oil;

provide an air-oil mist;

provide oil from oil wicks; or provide oil from an oil sump into which the components dip as they rotate.

Prior art of this invention is illustrated by example with a gas turbine engine lubrication system, as shown in FIG. 1. A lubrication system of some 30 qts of oil is used to lubricate and cool mainshaft bearings and the accessory gearboxes. An extensive network of high pressure oil feed lines are used with oil jets at the main bearing sites to introduce lubrication and cooling flows. The oil is scavenged and returned to a tank, oil cooler and filter for recirculation.

The technical limits of performance in a gas turbine engine, as well as other engine types, is the temperature limit of the lubricating oil. Extensive efforts are made to prevent oil coking, especially in the feed lines which can become clogged. To prevent coking the oil is cooled and not allowed to become stagnant, especially on certain metals which can catalytically accelerate the coking process. Conventional lubricants are carefully formulated synthetic ester base oils which have good thermal and oxidatively stability. These oils generally fall under the MIL-L-23699 specification which have strict limits on viscosity, pour point, flash temperature, load carrying capacity and coking attributes. The selection of these specifications are to assure that the oil is not too viscous (or solid) for low temperature starting (−40° F.), but yet viscous enough for high temperature running (bulk oil temperature of 450° F.). With current basestock and additive technology, there is little room for improvement with ester base oils. Alternative basestocks are PFPE's and polyphenyl ether (PPE) lubricants. Both of these have inferior boundary lubricating attributes and the latter oil does not have good low temperature properties. To satisfy high temperature operation for military engines high temperature solid lubricants have been investigated, but their performance is not reliable and their life is too limited to be practical. The primary limitations of conventional liquid lubricating systems is their limited temperature range and the complex hardware that is necessary to obtain maximum use out of the performance limits.

SUMMARY OF THE INVENTION

The method for providing broad temperature range lubrication within a simple system utilizes the evaporation of a fluid or solid which condenses in the form of a thin film on the bearing surfaces. The fluid is evaporated at a temperature slightly higher than the surfaces to be lubricated. The lubricating fluid is one that can be evaporated without excessive thermal degradation or deposit formation. Lubrication can be provided over an extended temperature range by the use of fluids covering a range of molecular weights or distillation temperatures.

The creation of a vapor allows easy delivery to the surfaces to be lubricated. The vapor can be delivered in small tubes with a carrier gas such as air or other process gas. To prevent condensation during delivery the carrier gas must be at a higher temperature than the condensation temperature of vaporized fluid. The vapor can be created by a heating source external or internal to the system to be lubricated. The vapor can be delivery with a flow directed at the lubricated surfaces or it can provide a vapor "environment" around the lubricated surfaces upon which condensation occurs at surface temperatures below the evaporation temperature of the fluid.

V/C lubrication is provided in an open system where at least part of the supplied vapor is lost during operation. V/C lubrication is provided in a closed system where the vapor is contained and naturally recirculated by evaporation at a heated source and condensation on a cooler bearing surface and the returned to the heated source for re-evaporation. The original fluid source is not lost. Only a small quantity of fluid is necessary to maintain lubrication. There is no viscous liquid that must be pumped before lubrication begins. Upon startup the residual films on the surfaces are sufficient to provide lubrication until the evaporated source is heated to provide replenishment vapor.

Lubrication is obtained over an extended temperature range by the use of fluids which evaporate and condense over a large temperature range. Low molecular weight PFPE fluids condense at temperatures below 100° C. (212° F.). High molecular weight PFPE fluids currently available condense at a temperature around 500° C. (932° F.). This allows V/C lubrication to be operative up to this temperature which is some 225° C. above the current high temperature gas turbine lubrication limits.

Because of the extended temperature range of V/C lubrication, there is no need to provide massive liquid coolant to bearing surfaces. The bearing surfaces can seek their own equilibrium temperature. Air cooling can be provided if necessary. Otherwise, natural heat conduction, radiation and convection within the system can be used to dissipate the heat. Bearing materials can accommodate elevated temperatures much easier than conventional liquid lubricants.

High speed components such as aircraft engine bearings are difficult to lubricate because of the internal windage generated by the rotating elements. Under race lubrication schemes are frequently used to supply the oil from the "inside" and allowed to be radially expelled from the bearing. Mist lubrication systems use high pressure air to inject the air-oil mist into and against the windage flow. With V/C lubrication a driving air is provided to impinge the vapor into the bearing. The velocity of the driving air required is a function of the relative mass×velocity of the windage air and the mass×velocity of the vapor. PFPE fluids have almost two times the density of conventional oils which makes it suitable of injecting into high speed rotating machine elements. The required driving air flow increases with beating speed. Another purpose of the driving air is to provide "direct contact" condensation. The driving air can be cooler than the delivered vapor. The direct contact with the vapor can begin the condensation process prior to the impingement of the vapor onto the bearing surface. The driving air can serve as a cooling air to cool the beating surfaces as well as a "direct contact condenser."

The V/C system described above can lubricate bearings over a broad temperature range. It can also lubricate high speed bearings with much lower torque. The lower torque comes from two primary factors: (1) less oil churning and (2) high bearing temperature lowers the traction (friction) coefficient within the contact which reduces the "frictional" torque component.

BRIEF DESCRIPTION OF THE DRAWINGS

An embodiment of the present invention is now described, by way of example, with reference to the accompanying drawings the purpose of which is to describe the broad temperature range lubrication of a high speed gas turbine engine bearing. Reference is given to the figures.

DETAILED DESCRIPTION OF THE PREFERRED EMBODIMENT

The invention of vapor/condensation (V/C) lubrication as disclosed in the companion patent application is described for the elastohydrodynamic (EHD) lubrication mechanism. Its performance is characterized with a single contact test simulator. The characterization discloses fundamental parameters such as traction coefficient vs temperature. EHD performance is judged by the traction behavior. It is also judged by the presence or absence of wear. In full scale hardware traction coefficient cannot be measured directly, but its effect is reflected in bearing torque or gear mesh heat generation. The invention is disclosed here by the preferred embodiment of V/C lubrication within full scale hardware, in particular, a high speed angular contact bearing for a small gas turbine engine.

Lubricating Materials and Bearing Materials

Figure 1:
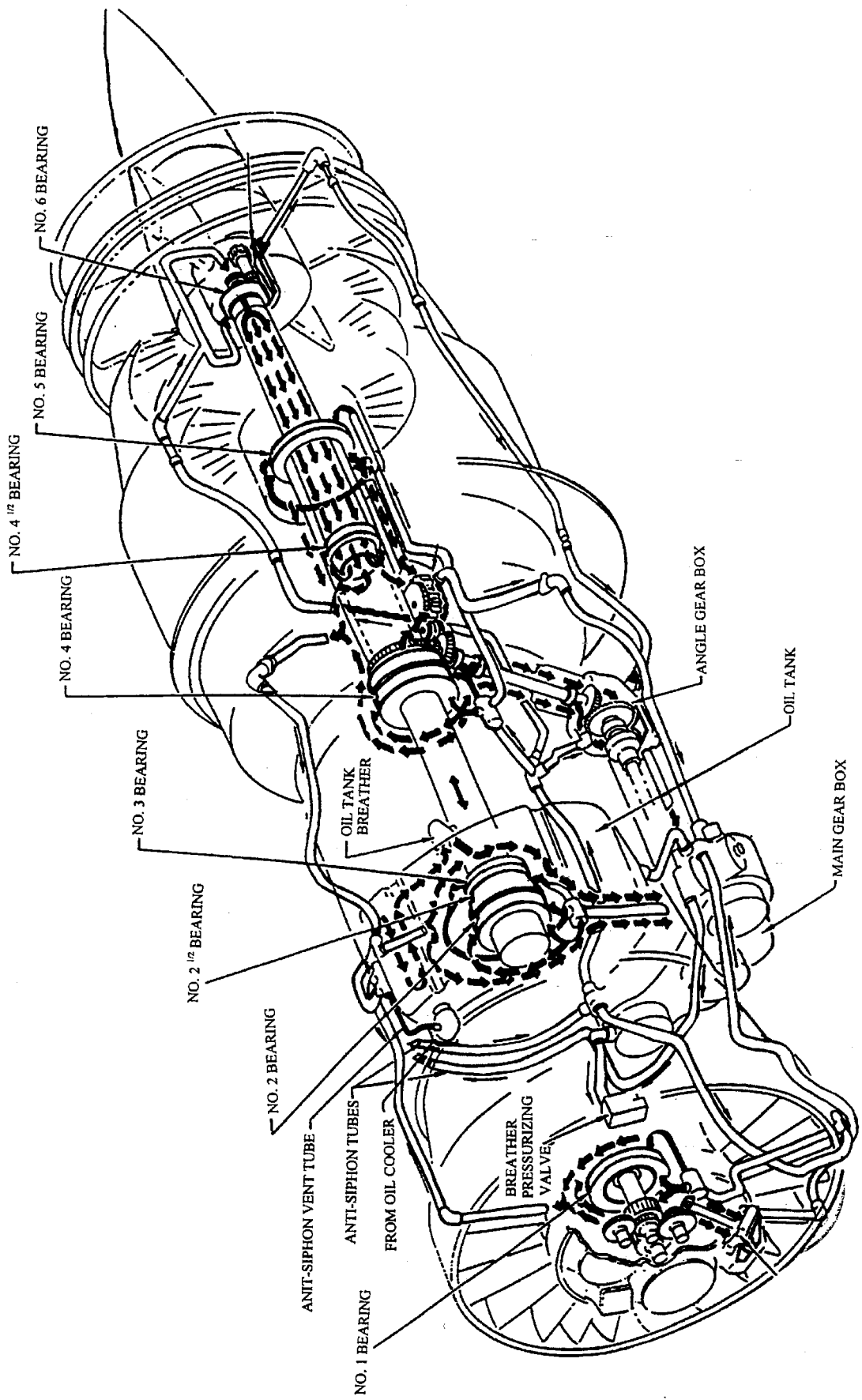
FIG. 1 complex lubrication system for conventional recirculation oil system.
Figure 2:
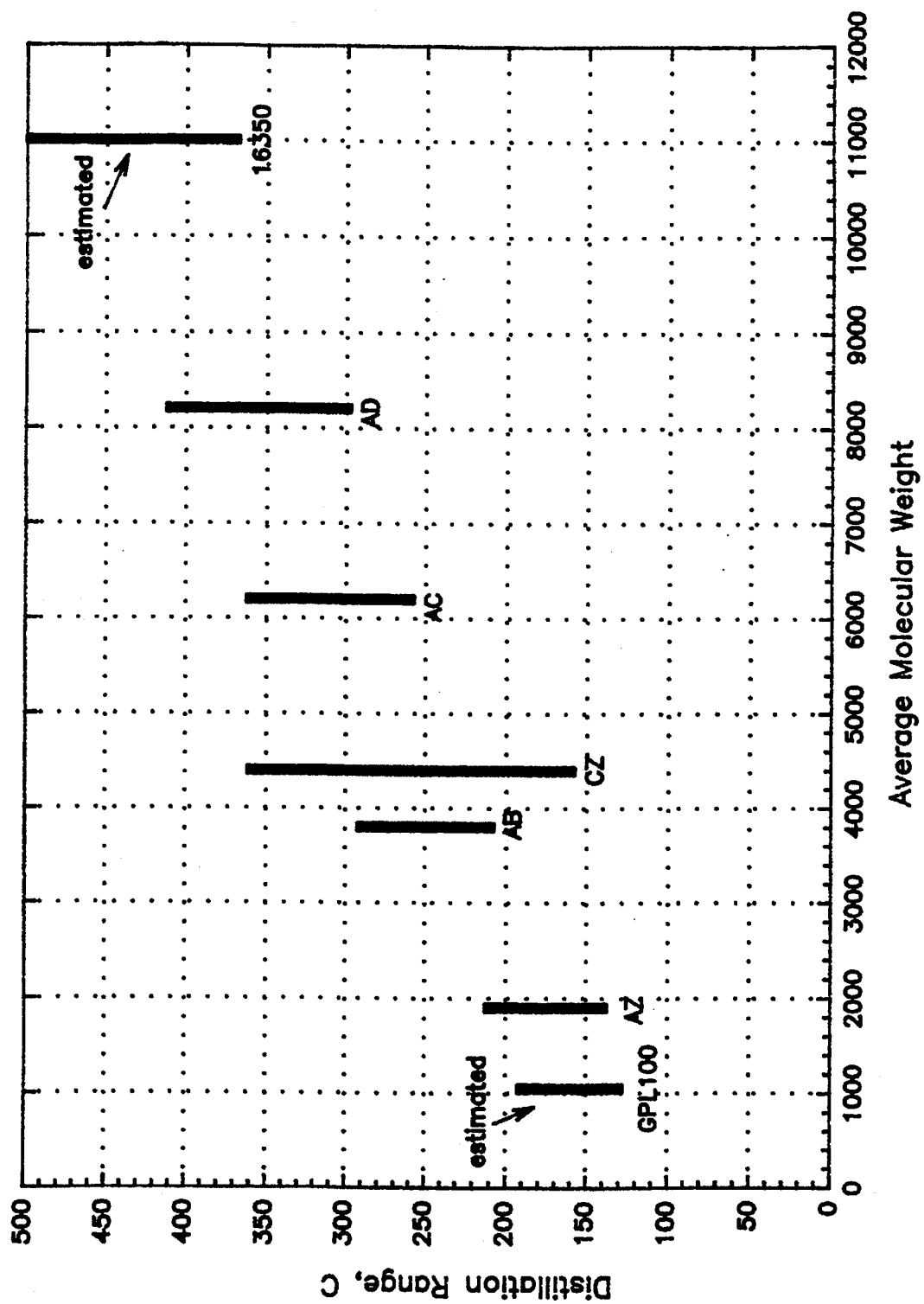
FIG. 2 shows the distillation (vaporization) temperatures of various PFPE lubricants.

The vapor lubrication example is demonstrated with the use of PFPE fluids which are available over a large range of molecular weights. A distillation chart is shown in FIG. 2. V/C lubrication is operable when the fluids are below the temperature of vaporization. The distillation or vaporization temperature range for a particular fluid depends on the range of molecular weights present. Narrow molecular weight fluids can be used as well as blended fluids which cover a large range of molecular weights. High molecular weight fluids, with correspondingly high viscosity, are used at high temperatures to provide a sufficiently thick EHD film. They can also be used at low temperatures where thick EHD films are generated. Low molecular weight fluids are frequently preferred at low temperatures to avoid unnecessary viscous friction and high bearing torque.

Above 350° C. PFPE fluids become corrosive to ferrous metals. For high temperature operation, ferrous bearing materials which should be made of a high temperature bearing steel, are coated with thin dense chrome (TDC) to hide the iron from corrosive attack. Bearing cages can be coated with silver as is customarily done to provide a low shear strength material to aid the hydrodynamic lubrication that occurs between cage/ball sliding contact and cage/land sliding contact. In this case, the silver also hides the underlying iron of the cage material for corrosion protection. The preferred rolling element, be it a ball or roller bearing, is a ceramic of silicon nitride which is corrosion resistant to PFPE's. Since silicon nitride has 40% the density of steel, it is most suitable for high speed rolling element bearings because it reduces the centrifugal loading on the outer raceway. The above preferred combination of materials are considered an excellent choice for conventional lubrication systems as well as a vapor lubricated system.

Vaporization Methods

Figure 3:
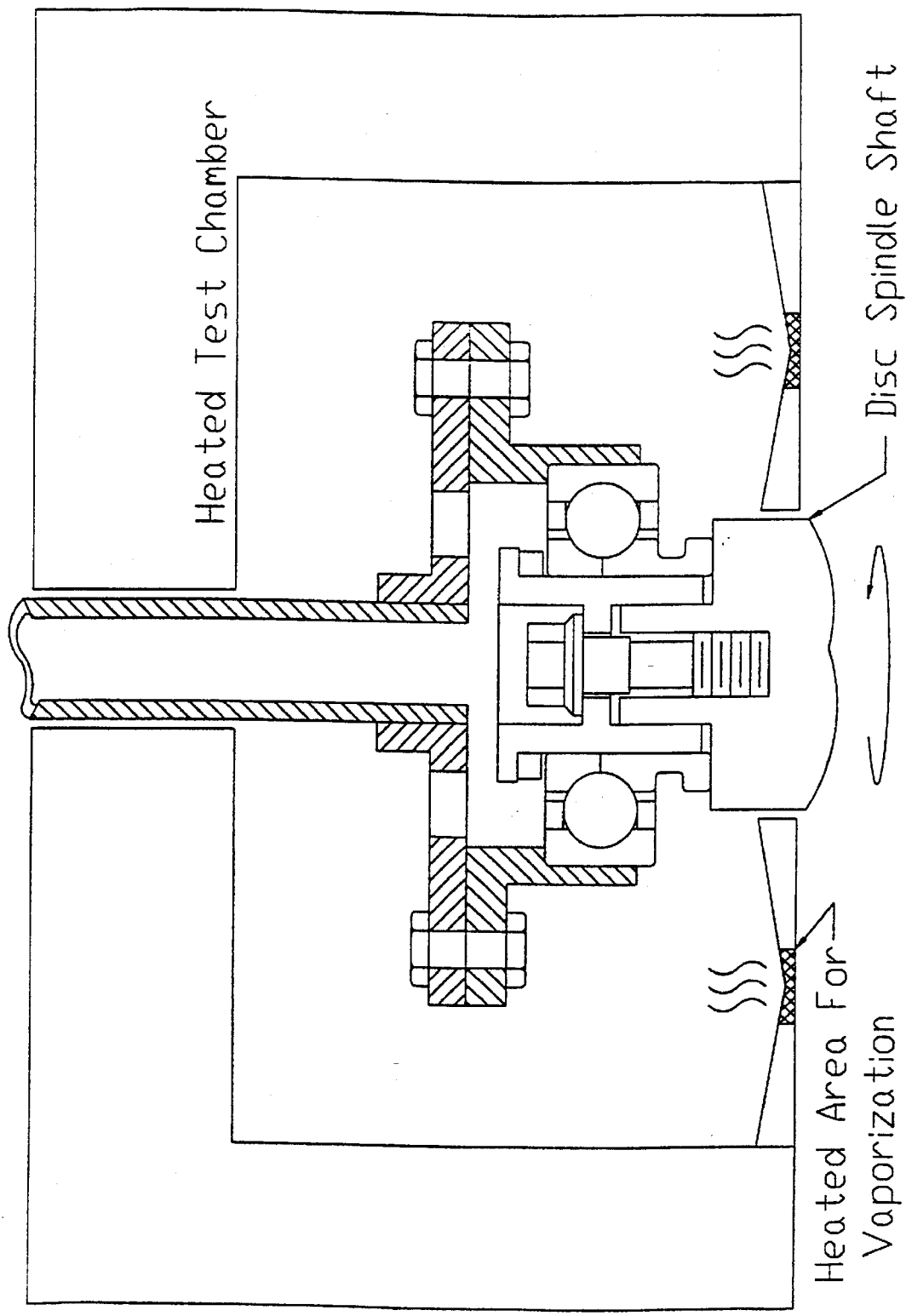
FIG. 3 vapor lubricated bearing in a closed system.

The invention utilized several methods of vaporization:

In situ vaporization—consists of a small heated surface within the bearing compartment that creates a vapor atmosphere as shown in FIG. 3 for a bearing test fixture where the bearing is mounted vertically. Condensation on the bearing surfaces occurs with the right differential temperature between the vapor and surfaces to be lubricated. The heated source can be externally powered or it can be a "hot spot" which is customarily found in turbine end bearing compartments. In situ vaporization is the preferred embodiment so long as sufficient flow into the component hardware is achieved.

Figure 4:
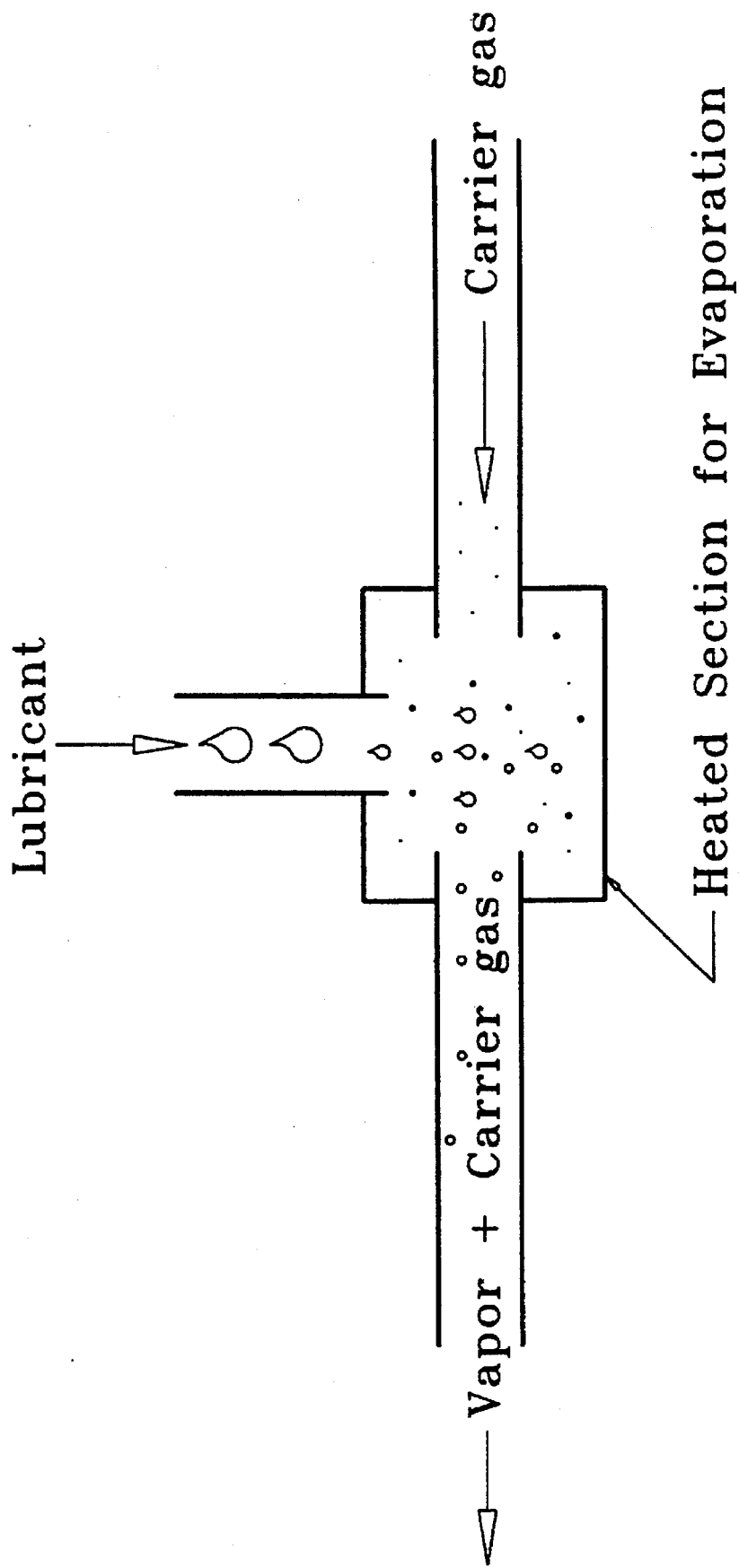
FIG. 4 external vapor delivery scheme for V/C lubrication.

External vaporizer with carrier gas—is a method that creates the vapor external to the bearing compartment which is then delivered with a carrier gas or air (see FIG. 4).

Figure 5:
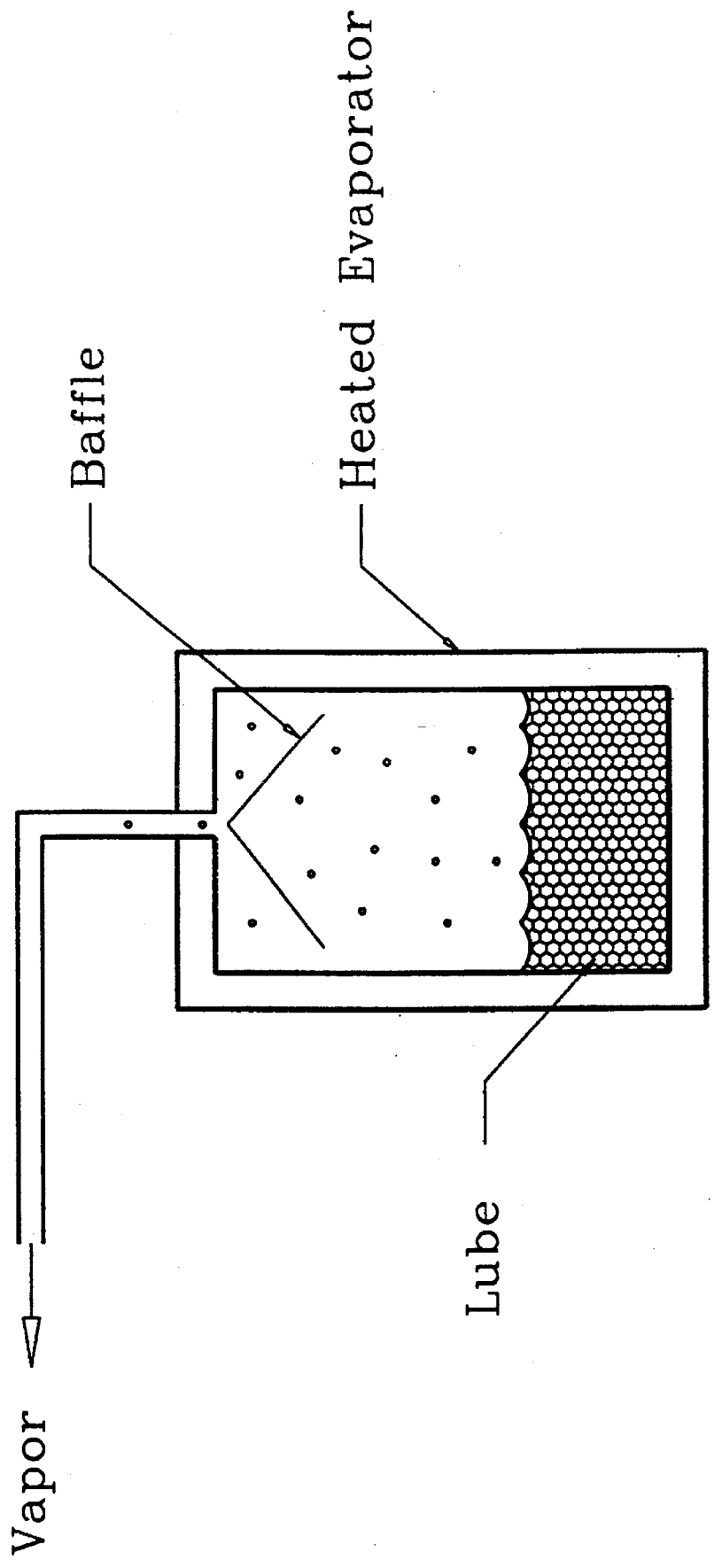
FIG. 5 self contained vapor supply system which uses its vapor pressure for delivery.

Self contained vaporizer—is a heated source which vaporizes the lubricant and also provides a vapor pressure sufficient to deliver the vapor (see FIG. 5).

Introduction of additives—is provided in three basic ways: (1) by way of a separate vapor delivery system similar to that used an external vaporizer with a carrier gas, (2) by way of an additive which is soluble in the lubricant and (3) by way of vaporization of the additive in the same vessel as the lubricant used for V/C lubrication. In the example with PFPE's which are high in density and low in solubility of most additives, the additive resides as a liquid on the surface of the PFPE. Evaporation of the PFPE bubbles through the additive and carries sufficient quantities with it to the lubricated site.

Delivery Methods for Low Speed Operation

Figure 6:
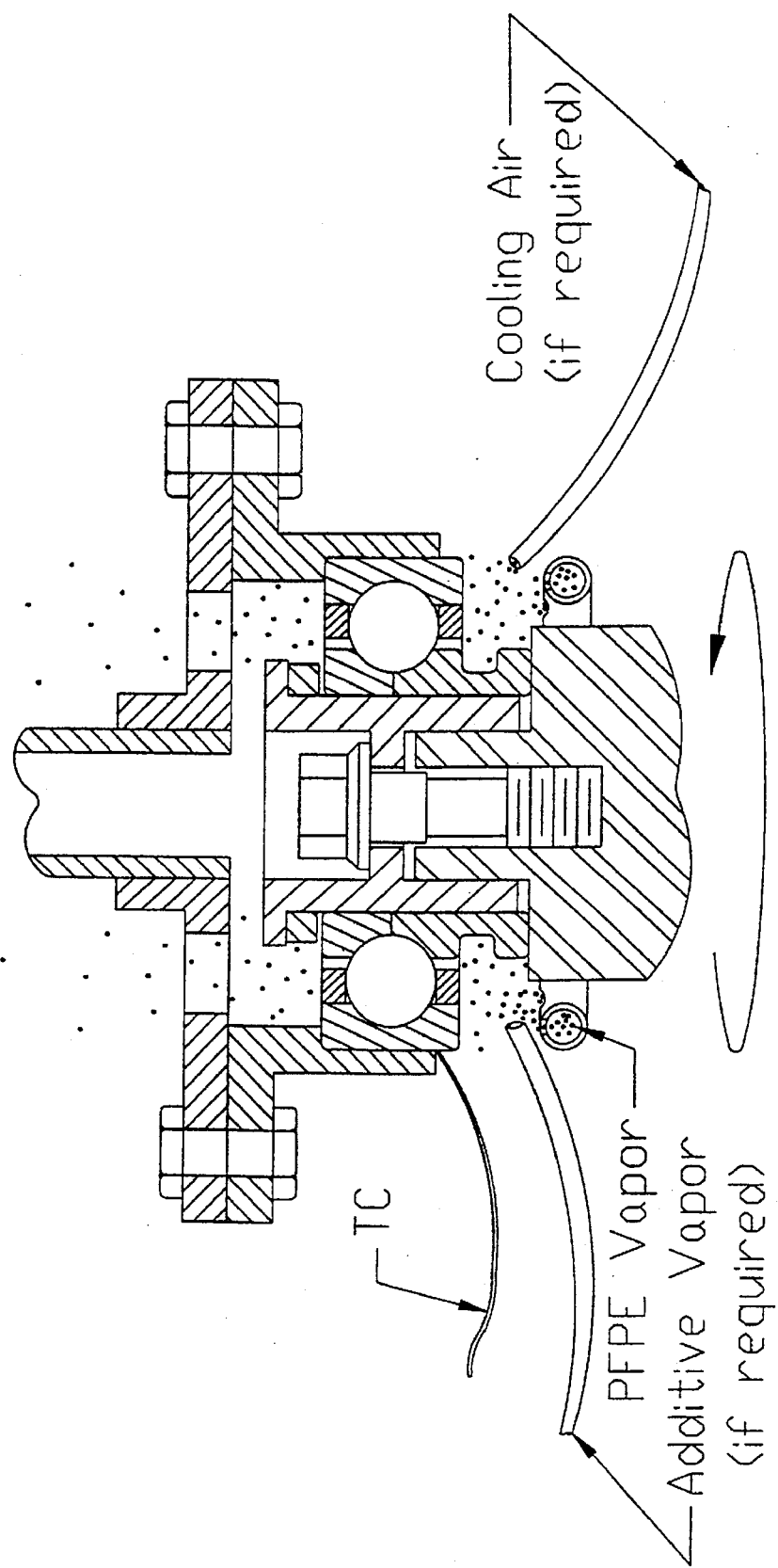
FIG. 6 schematic of externally vapor lubricated bearing.

Externally generated vapor is supplied to the lubricated hardware by way of small tubes. The preferred embodiment with PFPE's is nickel based tubes such as Inconel which are compatible with PFPE's. Several options exist for the introduction of the lubricating vapor, and if necessary a additive or cooling air as shown in FIG. 6.

In situ flow fields—are created within rotating bearing components that can "pump" vapor through the bearing. Also, the vaporization from a heated source can provide convective flow fields like that shown in FIG. 3 to deliver the vapor into the area to be lubricated.

Flow tubes—provide a concentrated delivery of the vapor to the lubricated component. A direct introduction of the vapor is necessary in an open system where the sufficiently dense atmosphere around the component cannot be maintained.

Direct Contact Condenser—is a method used to condense the vapor with a cooling gas stream between the vapor supply and the lubricated surface. The injection of the cooling air between the vapor supply tube and bearing shown in FIG. 6 can provide direct contact condensation. The molecular size vapor can be made to condense and coalesce prior to its impingement on the bearing surface. The cooling air then serves two functions—cooling and direct contact condensation. Direct contact condensation is described below in connection with a driving air for high speed bearings.

PERFORMANCE AND OPERATING PARAMETERS—Low Speed Operation

Figure 7:
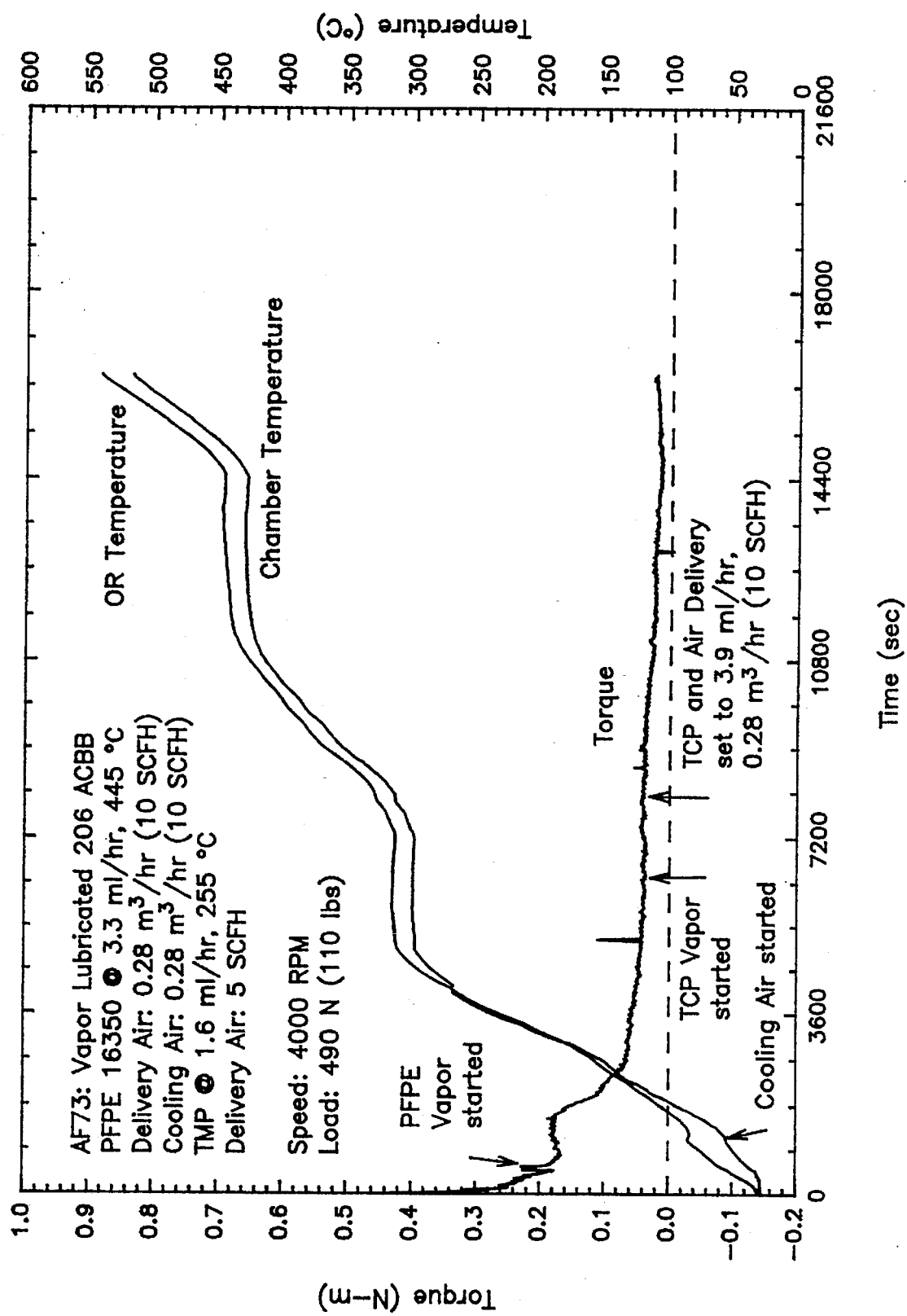
FIG. 7 bearing torque for a vapor/condensate lubricated bearing to 540° C.

The performance of the invention as embodied in an angular contact bearing is disclosed with a vapor supply system the is able to control and measure the supply parameters. For characterization of the invention the lubricant is supplied with a syringe pump and the gas flows are metered with flow devices. Bearing torque for a speed of 4,000 rpm is shown over a range of temperatures from 23° C. to 540° C. in FIG. 7. The bearing torque decreases with temperature (as expected from the traction coefficient in the companion patent application). The low torque (0.02 N-m) reflects good lubrication. The vapor supply parameters which are not optimal are:

| Lubricating oil | |
| --- | --- |
| PFPE oil molecular wt | 11,000 |
| vaporization temp | 445° C. |
| PFPE oil flow | 3.3 ml/hr |
| delivery air flow | 10 SCFH |
| Additive (TCP used above 300° C. as a precaution) | |
| TCP flow rate | 1.6 and 3.9 ml/hr |
| vaporization temp | 255 °C. |
| delivery air | 5 SCFH |
| Cooling air (used as a precaution) | |
| flow | 10 SCFH |

The uniqueness of the invention is the small quantity of lubricant (3.3 ml/hr) that is need to lubricate the bearing over a large temperature range. The test was terminated at 540° C. because of the thermal limit of the AISI M50 bearing steel.

The use of a high molecular weight PFPE causes a tacky residual oil film on the surfaces following cool down after the test. This residual film is sufficient for operation without vapor replenishment for a period of time necessary for a vapor supply source to become heated. To simulate this the test in FIG. 7 was run on a residual film without a vapor supply for the first 10 minutes of operation. The invention includes startup with a PFPE grease and a solid film of PTFE (Vydax).

Figure 8:
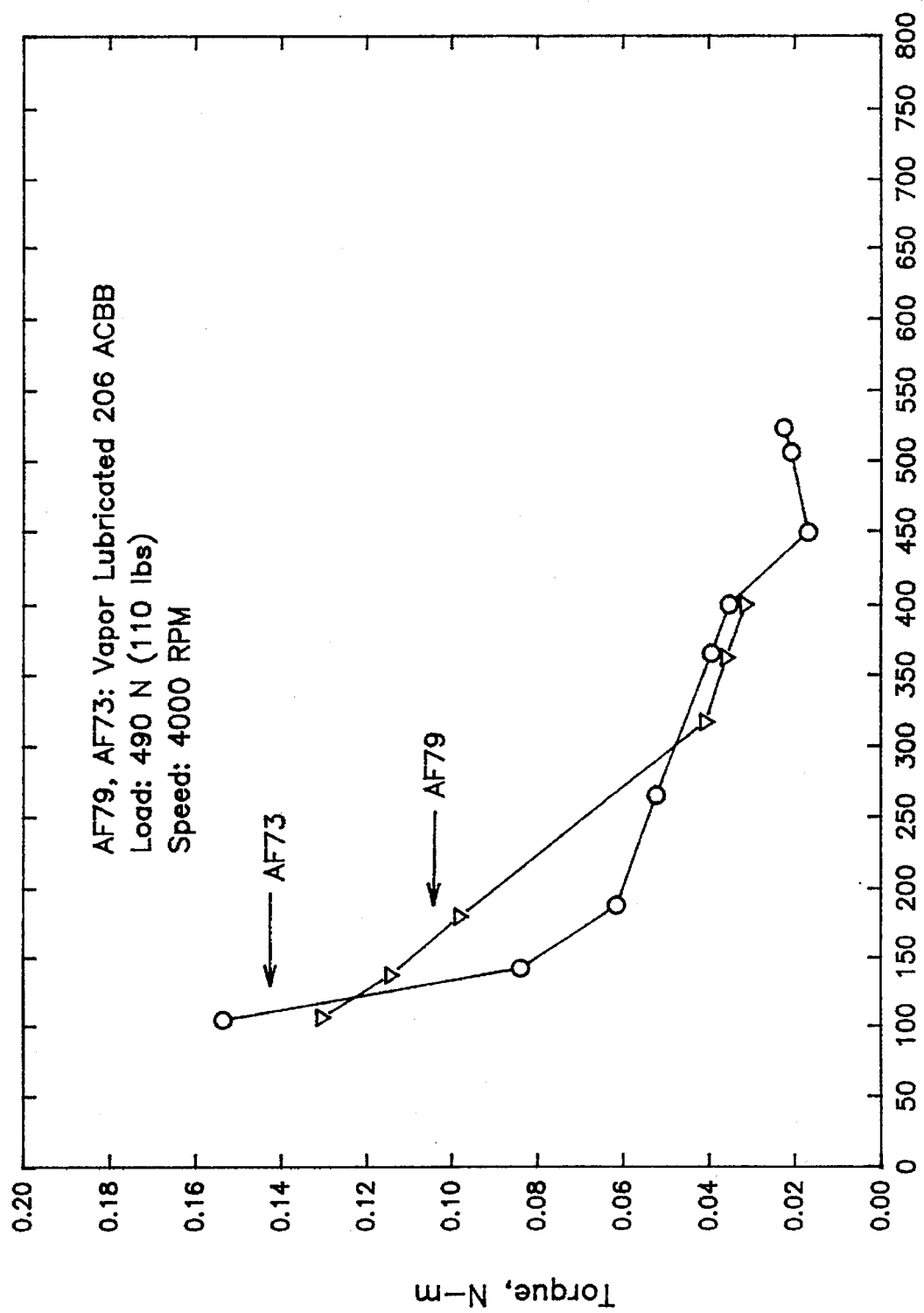
FIG. 8 shows a significant drop is torque with temperature for a V/C lubricated bearing.
Figure 9:
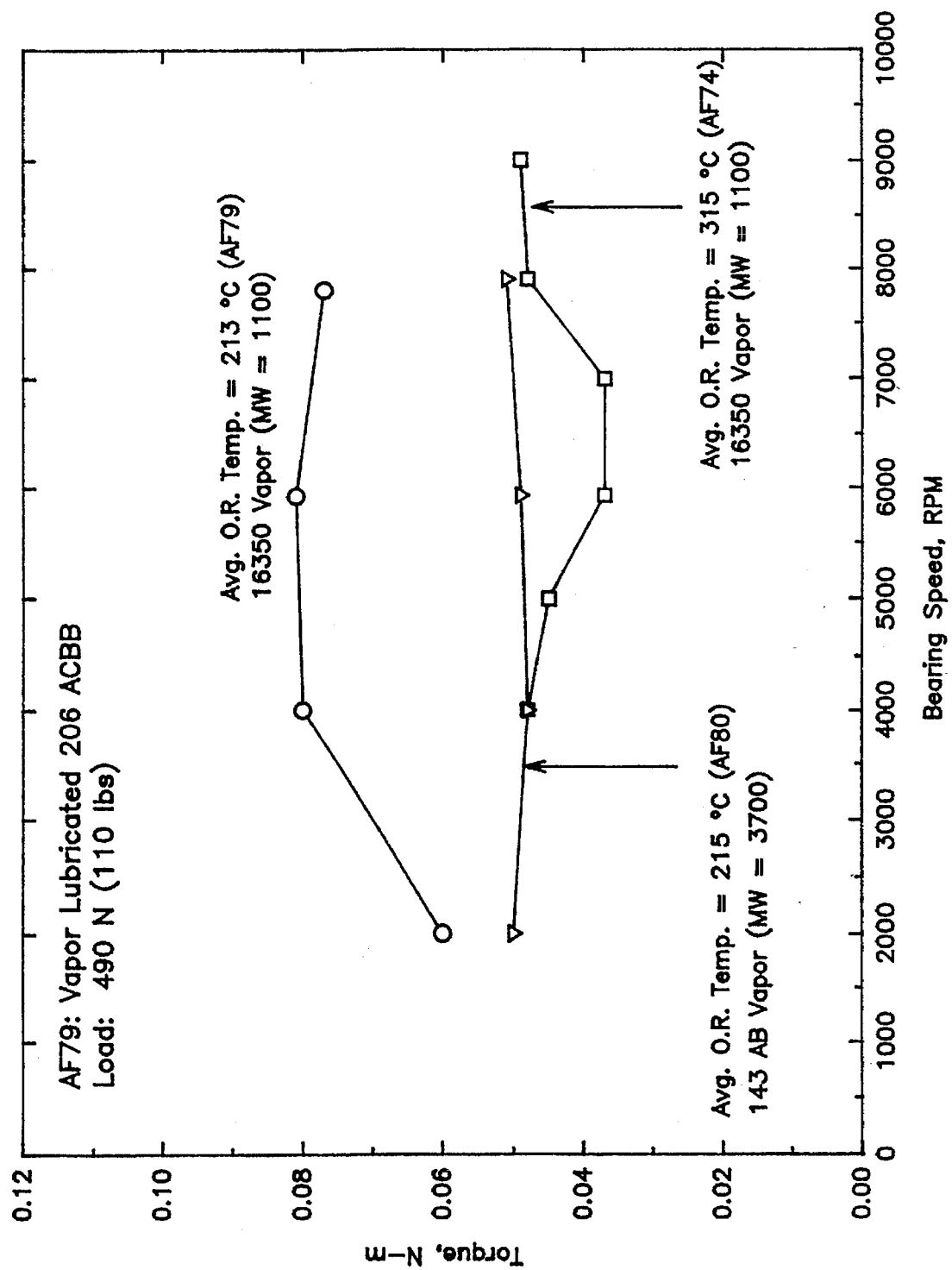
FIG. 9 show little change in bearing torque with speed.
Figure 10:
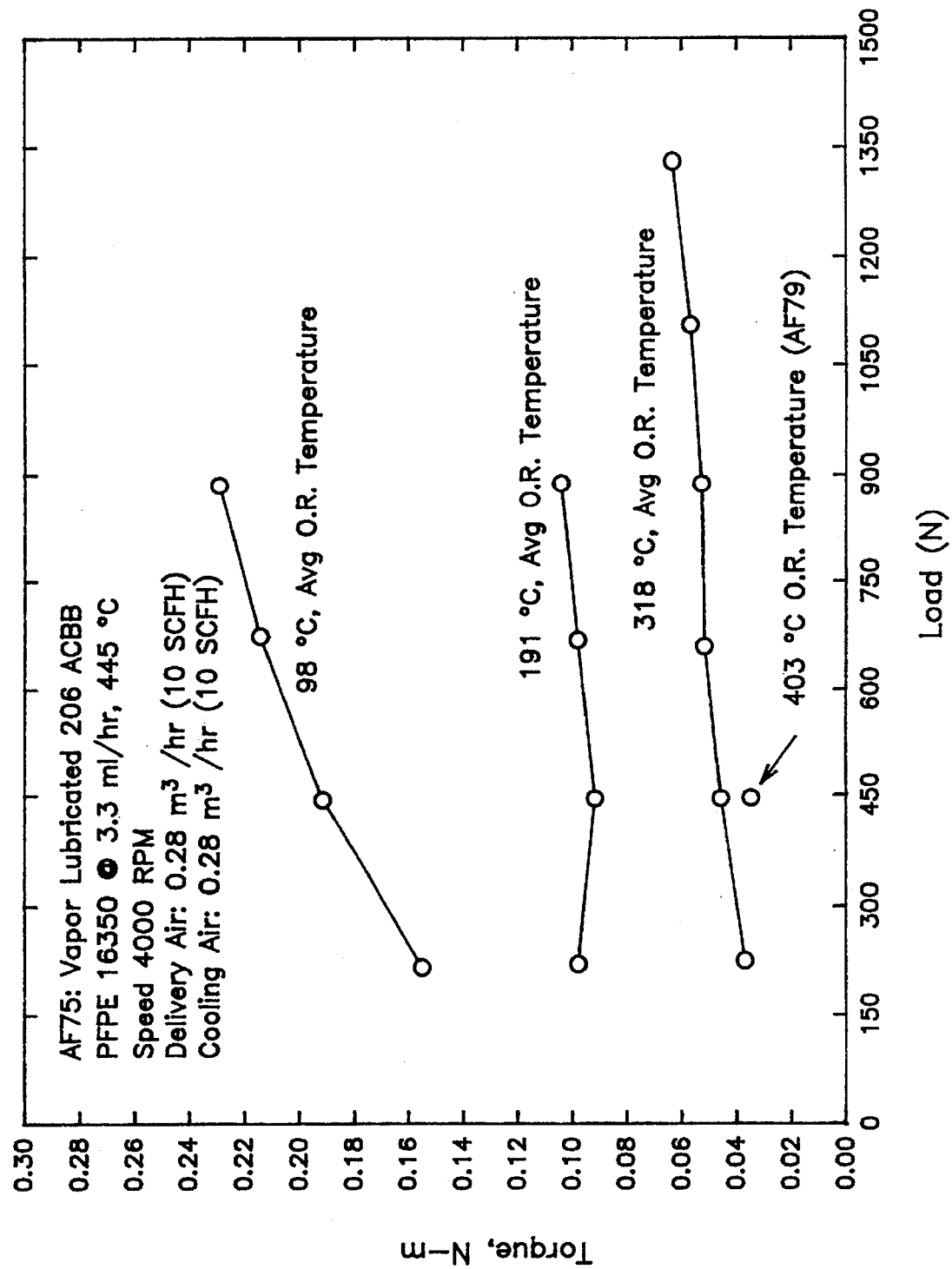
FIG. 10 shows only moderate increase in bearing torque with load.

Parametric tests over a range of loads, speeds and outer ring temperatures are shown in FIGS. 8–10. The bearing torque is the most sensitive to temperature. The bearing torque around 400° C. is only 0.02 N-m. The torque increases to 0.15 N-m at 100° C. with the high molecular weight PFPE. As disclosed in the companion patent application, the torque (or traction coefficient) can be lowered at low temperatures with a low molecular weight fluid per the concept of variable property lubrication.

PERFORMANCE AND OPERATING PARAMETERS—High Speed Operation

The utilization of the invention for applications such as gas turbine engines requires more than just high temperature operation. High speed bearings are difficult to lubricate because the internally generated mass×radial velocity (or windage) that must be overcome to transport the lubricant into the bearing. The current art for liquid lubricated bearing utilizes under race lubrication and cooling which transports the flow radically from within the bearing. The method can also be used with the present invention. It is also possible to use the present invention with a driving air flow that overcomes the high speed windage.

Figure 11:
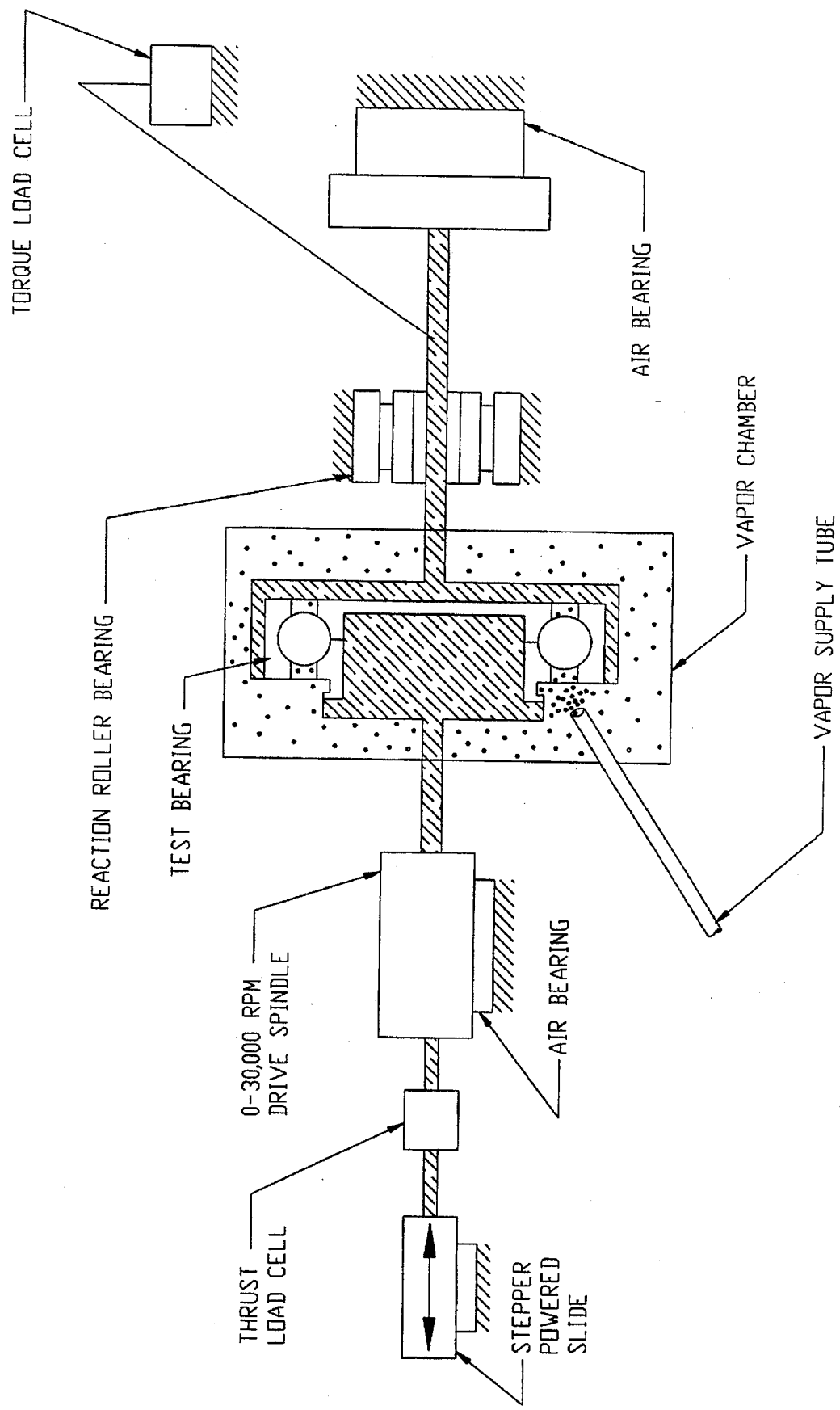
FIG. 11 is a schematic of a high speed bearing test configuration for V/C lubrication.
Figure 12:
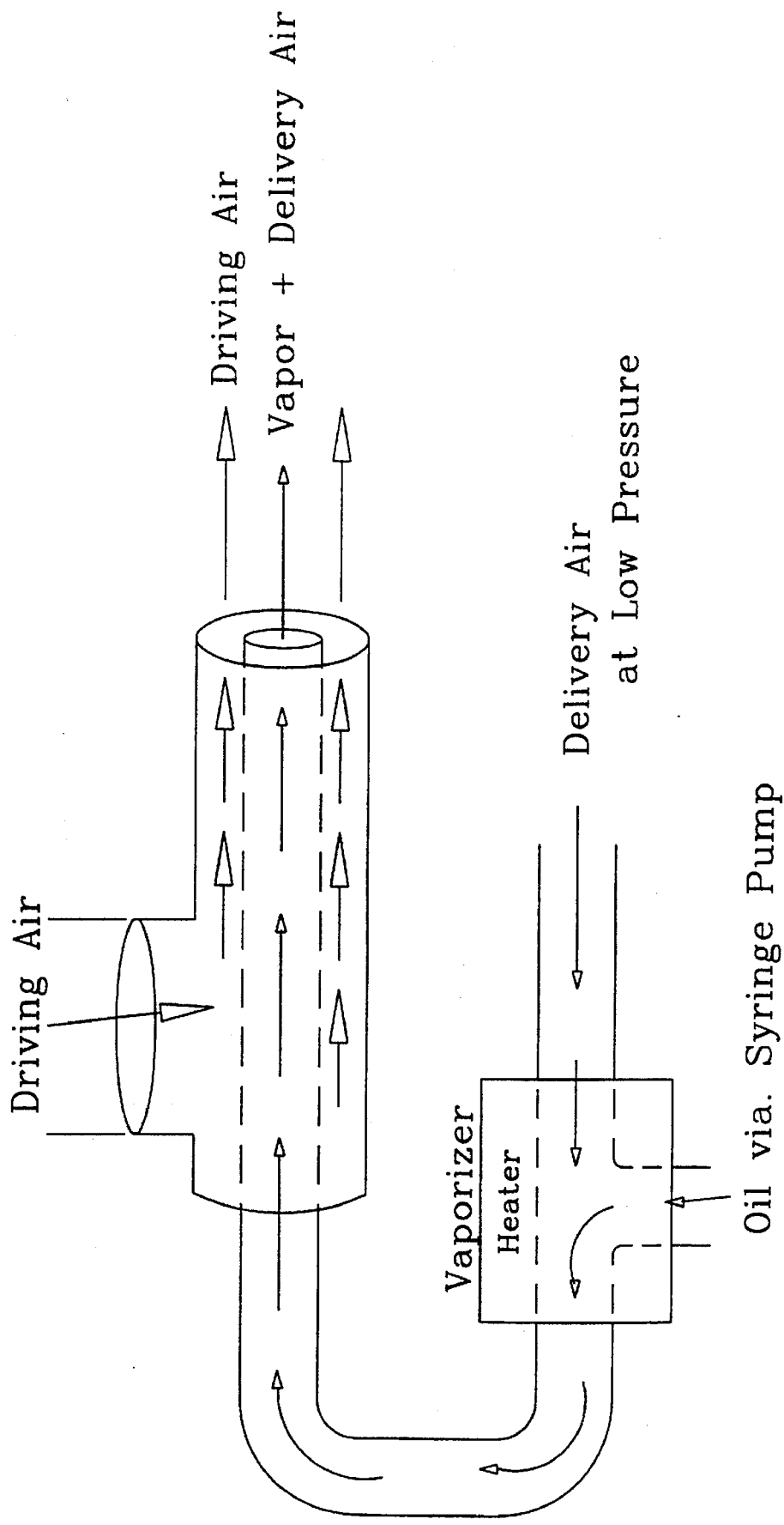
FIG. 12 is a schematic of the vapor delivery system with a coaxial driving air.
Figure 13:
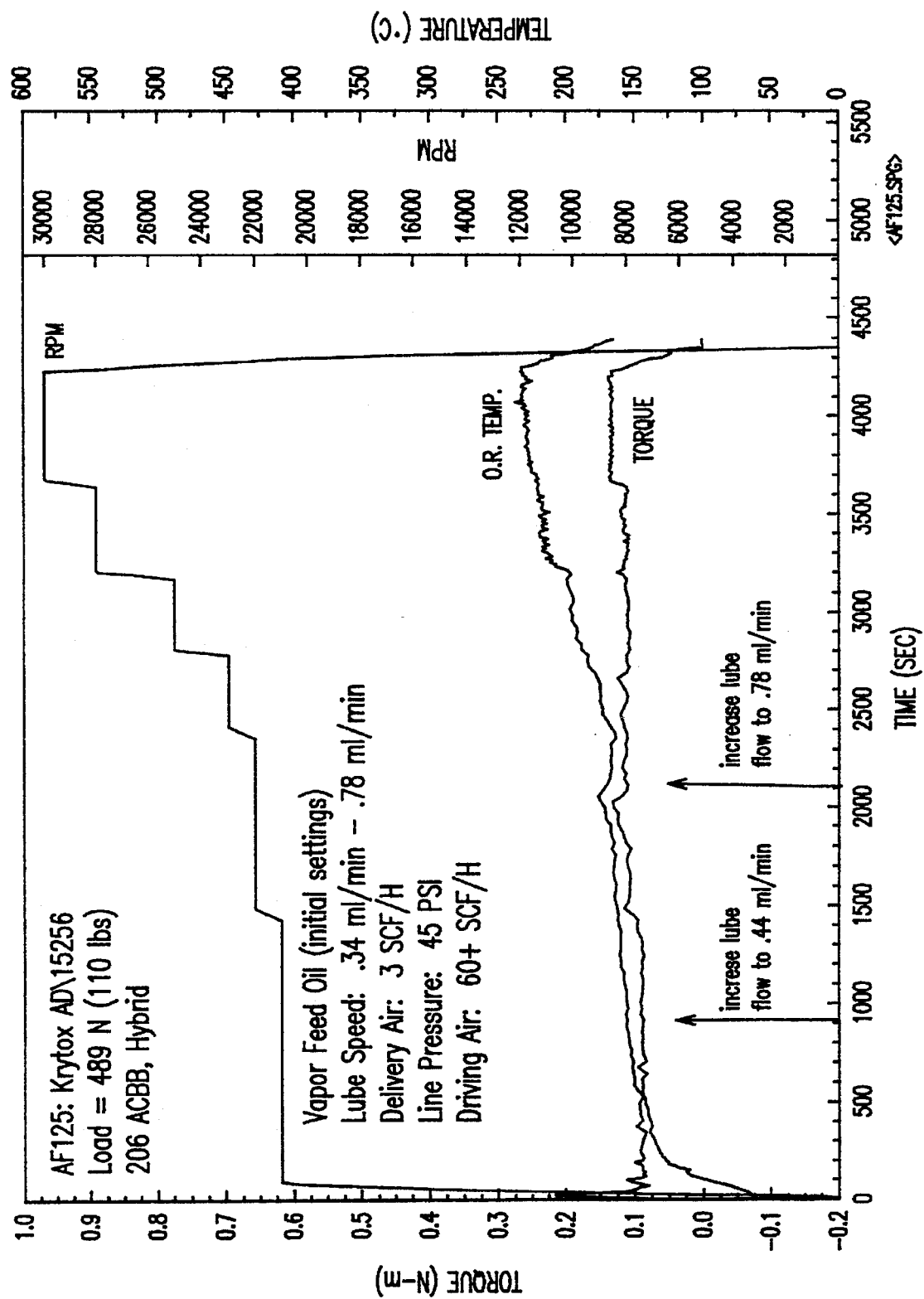
FIG. 13 shows bearing torque with WC lubrication up to 30,000 rpm and 225° C.
Figure 14:
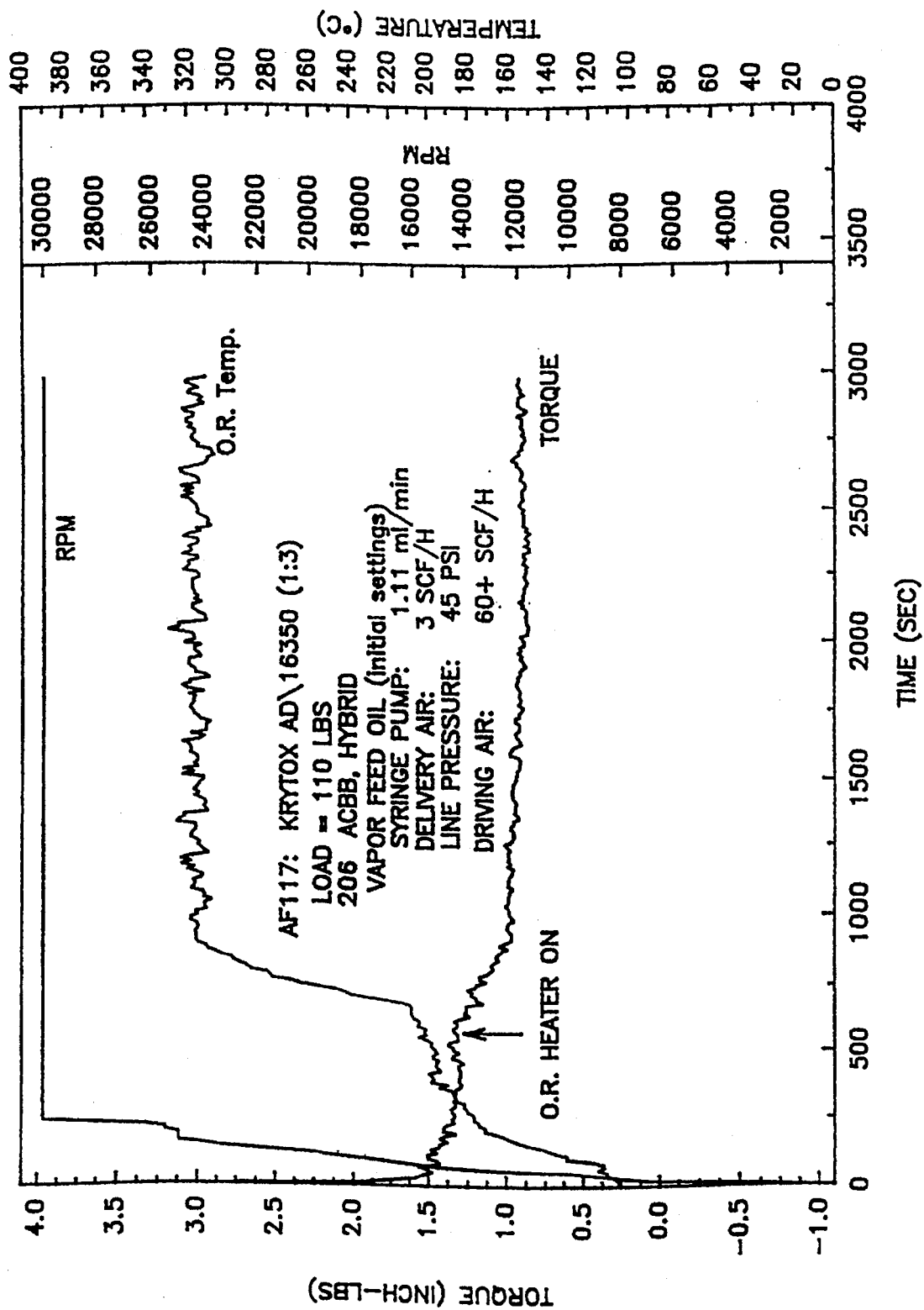
FIG. 14 shows bearing torque over a temperature range at 30,000 rpm.

The invention includes an embodiment of a vapor delivery for a the gas turbine bearing which is mounted this time horizontally as shown in FIG. 11 in a test rig capable of 30,000 rpm. The vapor flow is assisted by a coaxial tube as shown in FIG. 12, the outer section of which contains a heated driving air to cause acceleration of the vapor into the bearing cavity. The driving air so supplied, and depending on its temperature, can cause direct contact condensation. There is a direct relationship between driving air and bearing speed. At typical gas turbine speeds of 30,000 rpm a driving air flow rate of 60 SCFH is needed to overcome the bearing windage for injection of the vapor. The torque characteristics of a 30 mm bearing as lubricated by the invention is shown in FIG. 13. The torque is not very sensitive to bearing speed. As found above for the low speed bearing tests, the torque is more sensitive to temperature (see FIG. 14). The preferred V/C lubrication parameters for 30,000 rpm at a bearing temperature of 225° C. are:

| Lubricating oil | |
| --- | --- |
| PFPE oil molecular wt | 8,200/11,000 blend |
| vaporization temp | 445° C. |
| PFPE oil flow | 0.78 ml/min |
| delivery air | 3 SCFH |
| Driving air | |
| air flow | 60 SCFH |
| line pressure | 45 psi |

The invention is disclosed with a complex delivery system that is used to quantify the controlling parameters. The preferred configuration is an internal heat source for vaporization with the use of compressor bleed as a driving air for injection into the bearing. Compressor bleed air is readily available.

Interactive Vapor Supply and Bearing System for VP Lubrication

Figure 15:
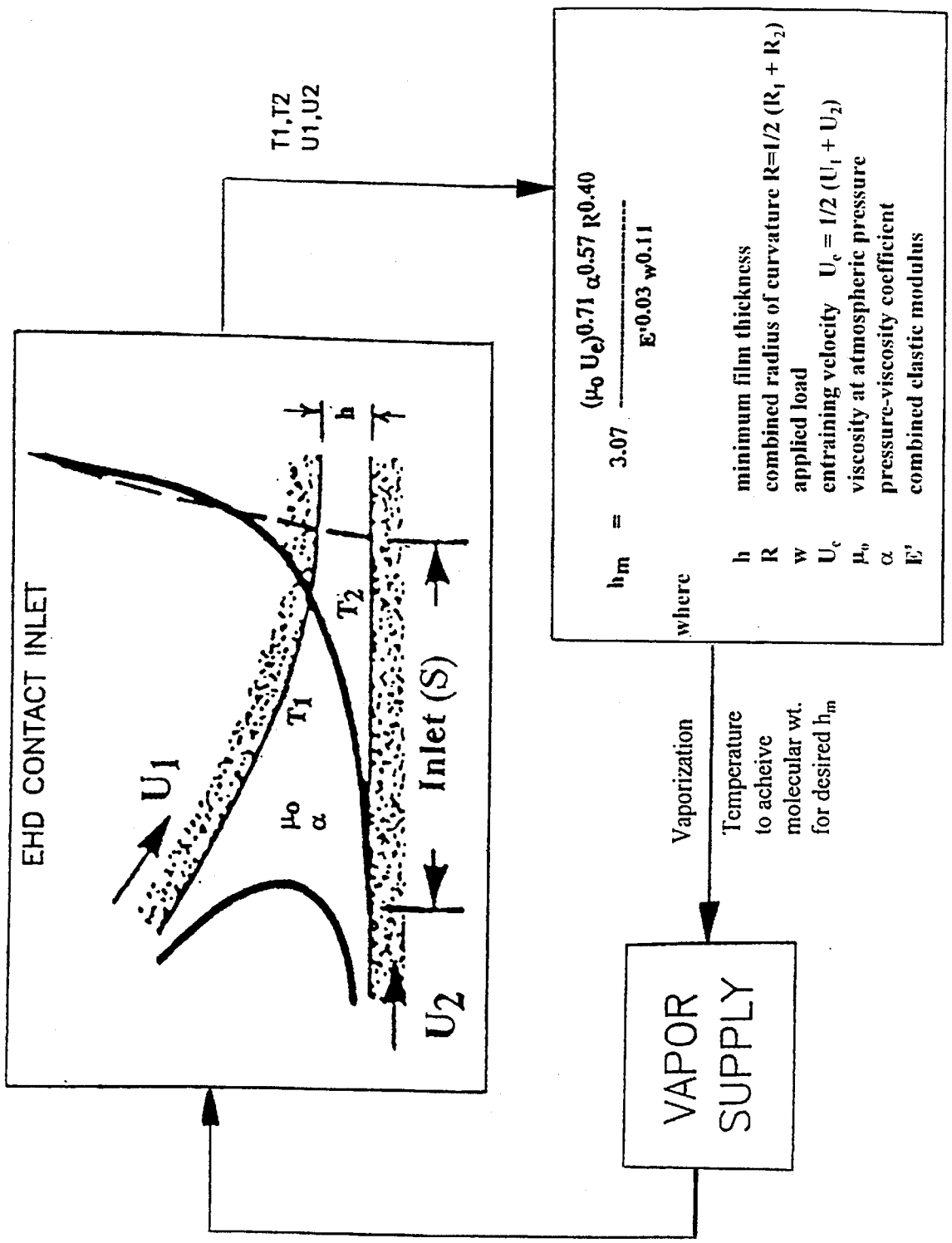
FIG. 15 is a flow chart of a micro-processor controlled vapor supply system to maintain a desired EHD film thickness.

The invention, by way of its ability to selectively supply or change the molecular weight of the fluid in the inlet region to an EHD contact, provides an opportunity for a microprocessor controlled lubricated contact for efficient performance over a large range of temperatures, speeds and loads. In most applications the EHD film thickness changes due to temperature and speed. Actually, load enters the picture indirectly by way of temperature (see FIG. 15). An increase in load does not significantly affect the EHD film thickness, but the load frequently causes in increase in operating temperature which has a greater impact on film thickness (except as noted for the high temperature range disclosed in this patent). With lubrication by the conventional art a decrease in speed or increase in temperature reduces the EHD film thickness—a fact of life.

The invention now enables the EHD film thickness to be maintained despite a change in temperature or speed. This is accomplished by monitoring the parameters which control the EHD phenomena in the inlet region, in particular the surface velocities ($U_1$, $U_2$) and surface temperatures ($T_1$, $T_2$). The parameters are relatively easy to obtain in most applications. While direct measurements of temperature may no be available, reasonable estimates can be made from reference temperatures in the vicinity. Using the EHD theory, decisions can be made regarding the increase in molecular weight of the vaporized fluid that is needed to preserve a desired EHD film thickness.

What is claimed is:

1. An apparatus for the vapor lubrication of a contact surface over a selected temperature range, which apparatus comprises:
   a. said non-conforming contacting surface adapted to carry a high load over at least one area of contact;
   b. means to supply at least one lubricant material in condensate state, said lubricant material having a vaporization temperature above the range of temperature operation of the contacting surface, and a condensation temperature within the range of temperature operation of the contacting surface, and further characterized in that said lubricant material exhibits the property that its vaporization occurs:
      i) without solid decomposition products at temperatures within the range of temperature operation of the contacting surface; and,
      ii) without reaching an auto ignition temperature within the range of temperature operation of the contacting surface;
   c. means to vaporize said lubricant material to form a lubricating vapor;
   d. means to deliver said lubricating vapor into proximity of said contacting surface such that said vapor impinges upon said contacting surface, permitting condensation of a sufficient quantity of said lubricating vapor on the inlet region of said contacting surface, to provide elastohydrodynamic (EHD) lubrication of said contacting surface by the condensation of said lubricant material.

2. The apparatus of claim 1 wherein said lubricant material is a perfluoropolyether (PFPE).

3. The apparatus of claim 1 further comprising means for the vapor deposition of a phosphate additive.

4. The apparatus of claim 3 wherein said phosphate additive is tricresyl phosphate.

5. The apparatus of claim 1 wherein said means to deliver said lubricating vapor is provided by vaporizing said lubricant material in sufficient proximity to said contacting surface.

6. The apparatus of claim 1 wherein said means to deliver said lubricating vapor is located remotely from said contacting surface, and means are provided to direct said lubricating vapor to said contacting surface.

7. The apparatus of claim 6 wherein said means provided to direct said lubricating vapor are flow tubes.

8. The apparatus of claim 1 wherein the components of said apparatus are constructed, at least in part, of materials compatible with perfluoropolyethers (PFPE's).

9. The apparatus of claim 6 wherein said means to direct said lubricating vapor further include a carrier fluid.

10. The apparatus of claim 9 wherein said carrier fluid is provided at a reduced temperature.

11. An apparatus for the vapor lubrication over a broad range of temperature operation of a non-conforming contacting surface carrying high loads over at least one area of contact, which apparatus comprises:
   a. said non-conforming contacting surface adapted to carry a high load over at least one area of contact;

b. means to supply a plurality of lubricant materials in condensate state, said lubricant materials comprising a blend of materials each having a vaporization temperature within a selective range within the range of temperature operation of the contacting surface, such that the vaporization temperature of the blend is substantially coextensive with the range of temperature operation of the contacting surface, and further characterized in that each lubricant material is itself a fraction of polymers of similar composition and molecular weights, and exhibits the property that its vaporization occurs:

i) without solid decomposition products at temperatures within the range of temperature operation of the contacting surface; and, ii) without reaching an auto ignition temperature within the range of temperature operation of the contacting surface;

c. means to create a lubricating vapor from said plurality of lubricating materials by heating said materials to a temperature above the operating temperature of said contacting surface, thereby vaporizing at least one of said plurality of lubricating materials; and, d. means to deliver said lubricating vapor into proximity of said contacting surface such that said vapor impinges upon said contacting surface, permitting condensation of sufficient quantity of said lubricating vapor of at least one lubricant material on the inlet region of said contacting surface, to provide elastohydrodynamic (EHD) lubrication of said contacting surface by the condensation of said lubricant material.

12. The apparatus of claim 11 wherein said lubricant materials are, at least in part, perfluoropolyethers (PFPE's).

13. The apparatus of claim 11 further comprising means for the vapor deposition of a phosphate additive.

14. The apparatus of claim 13 wherein said phosphate additive is tricresyl phosphate.

15. The apparatus of claim 11 wherein said means to deliver said lubricating vapor is provided by vaporizing said lubricant materials in sufficient proximity to said contacting surface.

16. The apparatus of claim 11 wherein said means to deliver said lubricating vapor is located remotely from said contacting surface, and means are provided to direct said lubricating vapor to said contacting surface.

17. The apparatus of claim 16 wherein said means provided to direct said lubricating vapor are flow tubes.

18. The apparatus of claim 11 wherein the components of said apparatus are constructed, at least in part, of a materials compatible with perfluoropolyethers (PFPE's).

19. The apparatus of claim 16 wherein said means to direct said lubricating vapor further include a carrier fluid.

20. The apparatus of claim 19 wherein said carrier fluid is provided at a reduced temperature.

21. The apparatus of claim 11 wherein said means to deliver said lubricating vapor is sufficient to overcome the internally generated mass times velocity of the contacting surface.

22. The apparatus of claim 21 wherein the means to deliver said lubricating vapor is provided under the contact surface for radial transport within the area of contact.

23. The apparatus of claim 1 wherein bearing materials are coated with thin dense chrome.

24. The apparatus of claim 1 wherein bearing cages are coated with silver.

25. The apparatus of claim 1 wherein rolling elements are comprised of silicon nitride ceramic.

26. The apparatus of claim 11 wherein bearing materials are coated with thin dense chrome.

27. The apparatus of claim 11 wherein bearing cages are coated with silver.

28. The apparatus of claim 11 wherein rolling elements are comprised of silicon nitride ceramic.

* * * * *